United States Patent [19]

Oota et al.

[11] Patent Number: 4,575,771

[45] Date of Patent: Mar. 11, 1986

[54] APPARATUS FOR SUPERIMPOSING AND REPRODUCING STILL PICTURE SIGNALS

[75] Inventors: Tadashi Oota, Tokyo; Masahiro Sawada, Kawasaki, both of Japan

[73] Assignee: Nippon Kogaku K.K., Tokyo, Japan

[21] Appl. No.: 493,713

[22] Filed: May 11, 1983

[30] Foreign Application Priority Data

May 14, 1982 [JP] Japan .................................. 57-80175

[51] Int. Cl.$^4$ ............................................. H04N 5/91
[52] U.S. Cl. .................................. 360/10.1; 358/335; 358/181; 360/33.1
[58] Field of Search ....................... 358/183, 333, 181; 360/35.1, 10.1, 11.1, 33.1, 67, 61

[56] References Cited

U.S. PATENT DOCUMENTS

| | | | |
|---|---|---|---|
| 3,501,585 | 3/1970 | De Lange | 360/67 |
| 3,886,589 | 5/1975 | Nasu | 360/11.1 |
| 4,057,830 | 11/1977 | Adcock | 360/35.1 |

*Primary Examiner*—Alan Faber
*Attorney, Agent, or Firm*—Michael N. Meller

[57] ABSTRACT

A superimposing and reproducing apparatus superimposes and reproduces a plurality of still pictures taken separately, e.g., a plurality of still picture signals recorded electrically without using any silver salt recording medium as a composite picture and displays it as a multiple-shot picture on an ordinary television receiver. The apparatus includes a switching circuit adapted to sequentially select the still picture signals read from the recording medium so as to produce a multiple-shot picture by virtue of the afterimage effect of vision.

14 Claims, 22 Drawing Figures

APPARATUS FOR SUPERIMPOSING AND REPRODUCING STILL PICTURE SIGNALS

BACKGROUND OF THE INVENTION

The present invention relates to apparatus for reproducing electrically recorded still picture information without using any silver salt recording medium, and more particularly the invention relates to a reproducing apparatus whereby a plurality of separately taken still pictures are superimposed and reproduced as a single picture and then displayed as a multiple-shot picture on the ordinary television receiver.

Generally, the multiple exposure technique is well known in the field of silver salt photography, etc., in which a plurality of different pictures are exposed on the same photosensitive surface, and by suitably adjusting the exposure times for taking these pictures, it is possible to obtain a multi-exposure picture.

This type of technique is not limited to the silver salt photography and it is also applicable to electronic picture recording and reproducing apparatus for recording and reproducing still picture signals from a variety of recording mediums including magnetic recording mediums such as a magnetic sheet, magnetic disc and magnetic drum and various other recording mediums such as a semiconductor RAM (random access memory), bubble memory, DRAW (direct read after write) memory and photomagnetic memory. Thus, by incorporating a 1-field or 1-frame memory in an electronic camera in correspondence to one picture so that the first photographed picture is stored in the memory and the first photographed picture is read from the memory upon initiation of the second photographing, it is possible to suitably combine the pictures together, record on a magnetic sheet or the like and reproduce to produce an electronic photograph having the similar effect as the multiple exposure in the silver salt photography. Where pictures are taken by means of a solid-state imaging device or the like, however, if the magnitude of a signal corresponding to each picture element is stored in analog quantity, a very great number of analog memories will be required for storing the whole information of one field or frame and this is substantilly the same even if the analog quantity is subjected to analog-digital conversion and then processed digitally. Thus, the required capacity of the 1-field or 1-frame memory is very great, making the use of this technique with portable electronic cameras, etc., impractical.

SUMMARY OF THE INVENTION

The present invention has been made in view of the foregoing circumstances and it is the primary object of the invention to provide a still picture signal superimposing and reproducing apparatus for use with an electronic camera of the type which produces reproduced pictures of still picture signals by means of the ordinary television receiver, whereby a plurality of still picture signals are superimposed by positively utilizing the afterimage effect of the human vision and thereby easily ensuring the multiple shot effect without using any large-scale field or frame memory but using memory means having a small capacity.

To accomplish the above object, in accordance with this invention there is thus provided an apparatus for superimposing and reproducing still picture signals in which a plurality of still picture signals resulting from separate shots, classified suitably and recorded separately field by picture on a recording medium, are read from the recording medium in such a manner that instead of adding the read still picture signals together, the still picture signals are changed over at intervals of one frame or line through switching means so as to produce a multiple shot picture by virtue of the afterimage effect of vision.

Generally, it is well known that each television picture (one frame) comprises two fields (odd and even fields) and the time for each vertical scanning is reduced so as to reduce the flicker of the picture to the human eye as far as possible. In accordance with the present invention, when two pictures are to be superimposed, the two fields correspond to two different still pictures so that the pictures are combined and reproduced as a single frame, thereby ensuring the desired multiple-shot effect.

In accordance with the invention, the two fields belonging to different pictures are combined into a single frame picture by the 2:1 interlaced scanning and the number of pictures to be superposed into a single picture is not limited to 2 but it may be 3 or more. In this case, while the flicker in the resulting picture will become marked if the number of the pictures (fields) superimposed into the picture is exceedingly large, no problem will be caused from the practical point of view as long as the number of pictures to be superimposed is not exceedingly large.

In accordance with the invention, the superposition of pictures is effected by superimposing the pictures field by field (e.g., the odd field corresponds to a picture A and the even field to a picture B) or on the basis of the horizontal scanning periods within the fields (e.g., the odd horizontal scanning corresponds to the picture A and the even horizontal scanning to the picture B). The former is referred to as a field multiplexing method and the latter is referred to as a line multiplexing method in the following description.

According to the field multiplexing method, the switching means sequentially selects and outputs the read still picture signals at intervals of one field period, and according to the line multiplexing method the switching means sequentially selects and outputs the read still picture signals at intervals of one horizontal scanning period.

Then, where a plurality of pictures are superimposed in accordance with the above-mentioned field multiplexing method or line multiplexing method, if one of the pictures is extremely dark and the other is extremely bright, for example, there is the danger of decreasing the effect of the superimposition and producing an unnatural picture far removed from the effect due to the multiple exposure in the silver salt photography.

Thus, it is another object of the invention to provide an apparatus for superimposing and reproducing still picture signals, which produces the same effect as a multiple exposure effect in the silver salt photography by means of the above-mentioned multiplexing methods and which therefore incorporates the following:

(a) a method of adding the average value of the luminance signal level during each field (e.g., the odd field) to the signal of the succeeding field (e.g., the even field) (hereinafter referred to as a field average photometric method), or (b) a method of adding the average value of the luminance signal level during each horizontal scanning period to the corresponding horizontal scan signal of the succeeding field (hereinafter referred to as a line average photometric method).

The above and other objects as well as advantageous features of the invention will become clearer from the following description taken in conjunction with the attached drawings.

DESCRIPTION OF THE PREFERRED EMBODIMENTS

Figure 1:
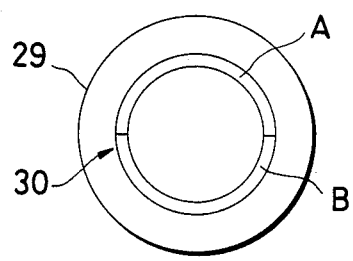
FIGS. 1 and 2 are schematic diagram showing the manners in which two still picture signals are recorded on a magnetic sheet.

The recording methods suited to the invention will now be described with reference to FIGS. 1 and 2. In the recording method of FIG. 1, the two fields corresponding to different two pictures A and B are each recorded on the half circle of a track 30 on a magnetic sheet 29 in response to the releasing of the shutter of a camera in synchronism with the rotation of a magnetic sheet recorder rotating at 1,800 rpm and the track is reproduced by a single playback head, thus effecting a multiplexing reproduction which will be described later.

Figure 2:
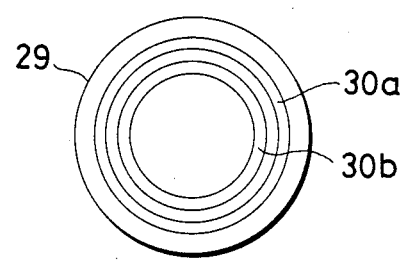

In the recording method of FIG. 2, in synchronism with the rotation of a magnetic sheet recorder rotating at 3,600 rpm the first shooting records one field of the picture A on a track 30a and the second shooting records one field of the picture B on a track 30b. The reproduction of the recorded pictures by two playback heads makes possible a multiplexing reproduction which will be described later.

As regards the multiplexing of three or more pictures, it can be effected easily recording three or more fields of the pictures on three or more tracks and using three or more playback heads.

Next, a detailed description will be made of the superimposed reproduction method of the invention which is used to reproduce the video signals recorded in the above-mentioned manner so as to ensure the desired multiple-shot effect.

Figure 3:
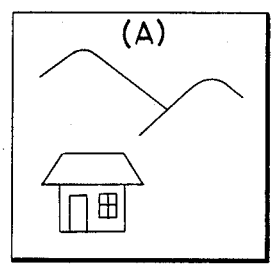
FIGS. 3 and 4 are schematic diagrams showing two different pictures to be superimposed.
Figure 4:
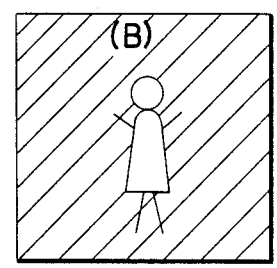

Assume now that the two pictures taken and recorded (the field recording) respectively correspond to the pictures A and B shown in FIGS. 3 and 4, respectively.

Figure 5:
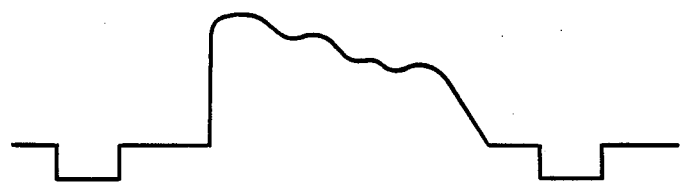
FIG. 5 is a waveform diagram showing the field signal of a picture A.
Figure 6:
FIG. 6 is a waveform diagram showing the field signal of a picture B.
Figure 7:
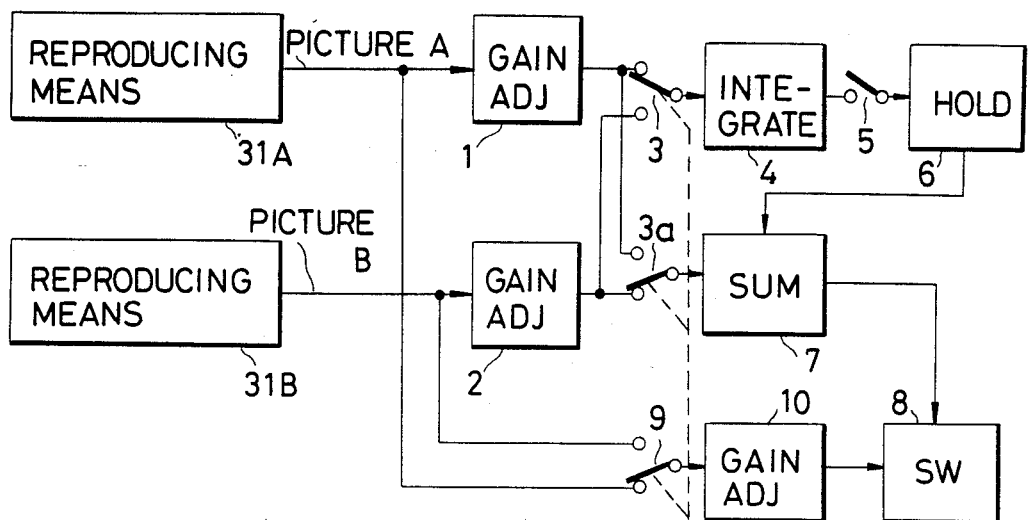
FIG. 7 is a block diagram showing an embodiment of the invention.
Figure 8:
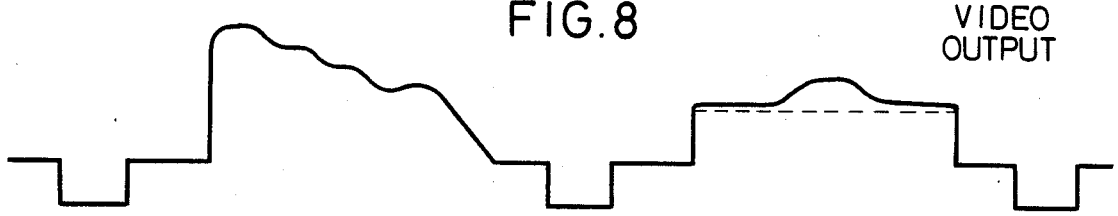
FIG. 8 is a waveform diagram showing an example of the video signal produced according to the invention.

FIG. 5 show the waveform of the reproduced video signal (hereinafter referred to as a signal A) of FIG. 3 (the picture A) and FIG. 6 shows the waveform of the reproduced video signal (hereinafter referred to as a signal B) of FIG. 4 (the picture B). Each of the waveforms corresponds to one vertical synchronization period and the horizontal synchronizing signal is omitted. Hereinafter, only the luminance signal will be described. Then, by simply displaying the two picture signals on the screen in correspondence to the odd and even fields, it is possible to effect the superposition by the field multiplexing. However, if the background of the person in the picture B is very dark, for example, there is the danger of deteriorating the effect of the superimposition in the picture resulting from the combining of the pictures A and B as such and causing the picture to appear unnatural. Thus, in order to reduce this danger, when combining the picture B with the picture A, some of the luminance information of the picture A is first added to the picture B and then the two pictures are combined, thereby preventing the picture from appearing very poor. FIG. 7 shows the circuit construction of an embodiment (the field average photometric and field multiplexing method) adapted for this purpose. In FIG. 7, numerals 31A and 31B designate reproducing means each including a reproducing head so as to deliver the signal A (designated as the picture A in FIG. 7) and the signal B (also designated as the picture B) read from the recording track on the magnetic sheet. Numeral 1 designates a circuit for adjusting the gain of the luminance information of the signal A which is added to the signal B, and 2 a gain adjusting circuit for the signal B which is similar to the circuit 1 and operable so as to adjust the luminance gain of the picture B when superposing the secondary picture B on the primary picture A. The circuits 1 and 2 are both designed so that while looking at the screen, the operator can each time set the circuits in accordance with the pictures so as to provide the optimum gains from the visual perception point of veiw. A switch 3 is operatively associated with switches 3a and 9 and it forms a circuit which selects one or the other of the pictures A and B as the primary picture. The reason is that where, for example, the secondary picture is originally very bright, even if the average value for one field period of the luminance signal level of the primry picture A is added to the secondary picture B, this only causes the brightness of the secondary picture B to approach the saturation and thereby produce a bad picture and in such a case the switches 3, 3a and 9 are operated so as to change the relation between the primary and secondary pictures. In the condition of FIG. 7, the switches 3, 3a and 9 are set so that the picture A is selected as the primary picture and the picture B is selected as the secondary picture to be inserted. Numeral 4 designates an integrating circuit for obtaining the average value of the luminance information of the picture A, and a sampling circuit 5 and a hold circuit 6 form a sample and hold circuit for holding the average luminance level obtained by the integrating circuit 4 during the time that the picture B is being reproduced. A circuit 7 is a summing circuit for adding the output of the hold circuit 6 to the picture B. In this way, a composite video signal is finally produced as shown in FIG. 8 by combining the picture A and the picture B, combined with the luminance information of the picture A, in correspondence to the odd and even fields and delivered to the television receiver through a switch circuit 8. Note that a circuit 10 is a luminance gain adjusting circuit for the primary picture (the picture A in the illustration) and, while looking at the screen, the operator can set the circuit 10 to provide the optimum gain as in the case of the circuits 1 and 2. While, in this embodiment, the analog signals are used, the same effect can be easily obtained in a digital manner.

Figure 9:
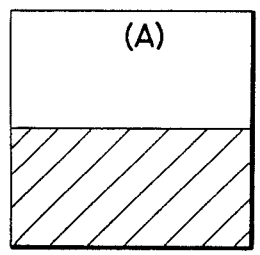
FIG. 9 is a schematic diagram showing an image of a high-contrast object.
Figure 11:
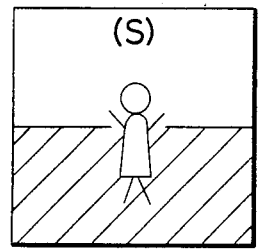
FIG. 11 is a schematic diagram showing the picture produced by superposing the picture of FIG. 9 and the picture of FIG. 4.
Figure 10:
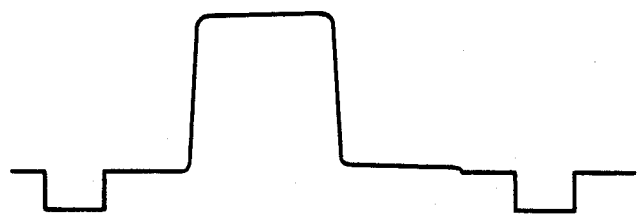
FIG. 10 is a waveform diagram showing the field signal of the picture in FIG. 9.
Figure 12:
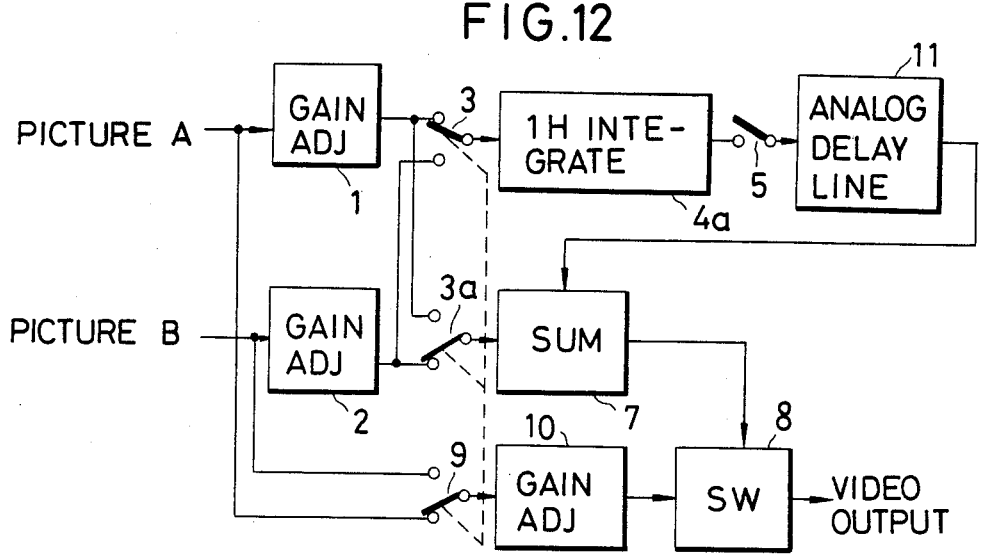
FIG. 12 is a block diagram showing a second embodiment of the invention.

A second embodiment of the invention will now be described. Assuming now that in the above-described first embodiment the picture A is a shot of an object having a very strong contrast as shown in FIG. 9 (e.g., a shot of the coast line or shadowgraph), the video signal of the picture A becomes as shown in FIG. 10 so that if this video signal is integrated to use the resulting single integration value as a representative value of the picture A in the composite picture S (FIG. 11), produced by combining for example this picture A and the picture B of FIG. 4, the upper half of the person existing in the bright portion of the picture A is excessively emphasized visually. This gives a sense of ill matching with respect to the lower half of the body existing in the dark portion of the picture A. Thus, in accordance with the present embodiment, instead of integrating the picture A as a whole, the result of the integration for each horizontal scanning line (1H) is sampled and held and then it is added to the picture B, thereby dealing with large luminance variations in the vertical direction. FIG. 12 shows the circuit construction of this embodiment (the line average photometric and field multiplexing method). In the circuitry of FIG. 12, those component parts which In the circuitry of FIG. 12, those component parts which are the same in operation with their counterparts in FIG. 7 are designated by the same numerals and only the remaining circuits will be explained. A circuit 4a is a 1H integrator having a time constant shorter than that of the integrating having a time constant shorter than that of the integrating circuit 4, and a circuit 11 is an element (e.g., an analog delay line capable of providing a delay of over 262 lines such as a CCD or BBD) for providing a delay of one field period in place of the hold circuit 6.

Figure 13:
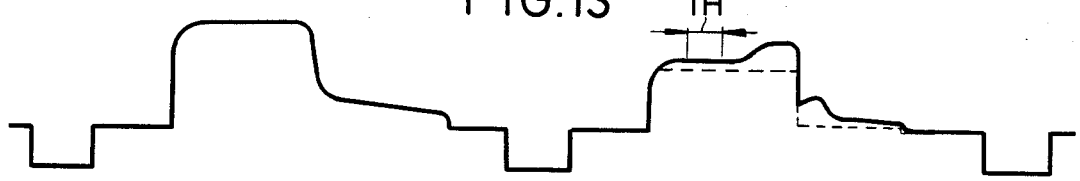
FIG. 13 is a waveform diagram showing an example of the video signal output produced by the circuit construction of FIG. 12.

FIG. 13 shows an exemplary waveform of the video signal combined according to this embodiment and corresponding to FIG. 8. Note that while, in this embodiment, the analog delay line is used as a memory device, this portion can be easily processed digitally by using an A/D converter, D/A converter, shift register or the like and the memory capacity of the shift register or the like can be reduced considerably.

Still another embodiment of the invention will now be described.

Figure 14:
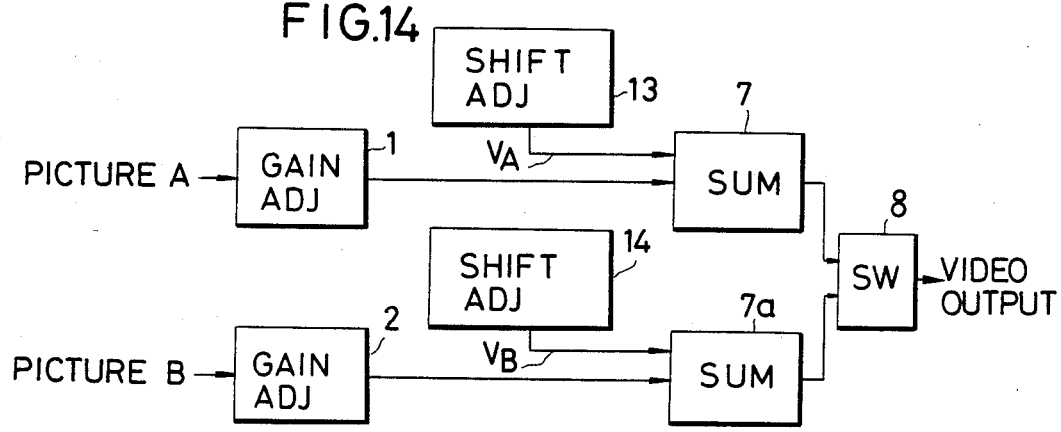
FIG. 14 is a block diagram showing a third embodiment of the invention.
Figure 15:
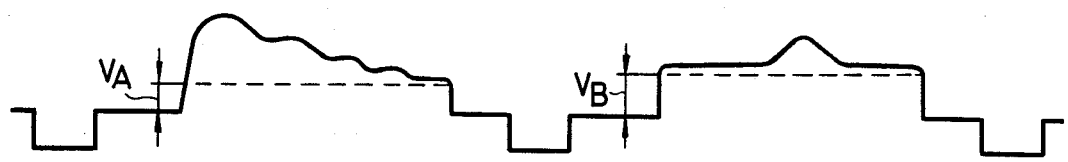
FIG. 15 is a waveform diagram showing an example of the video signal output produced by the circuit construction of FIG. 14.

Contrary to the previously described two embodiments, the pictures are not classified into a primary picture and an insertion picture, and the luminance gains and level shifts of the two pictures can be set entirely independently of each other. Thus, while looking at the screen, the operator can operate continuously so as to change from a condition where one of the pictures is practically not displayed to another conditin where the other picture is practically not displayed. FIG. 14 shows an exemplary circuit construction of this embodiment. In FIG. 14 as in the case of FIGS. 7 and 12, circuits 1 and 2 are gain adjusting circuits for adjusting the gains of the luminance signals of the pictures, and circuits 13 and 14 are shift adjusting circuits for applying suitable bias level $V_a$ and $V_b$ to the luminance signals of the pictures and adjusting the brightness of the picture as a whole. While looking at the screen, the operator can adjust each of the circuits 1, 2, 13 and 14 to the optimum value. Circuits 7 and 7a are summing circuits for adding the bias levels from the circuits 13 and 14 to the gain-adjusting video signals, and a circuit 8 is a switching circuit for switching the outputs from the circuits 7 and 7a at intervals of one field. FIG. 15 shows an exemplary waveform of the composite video signal produced by the present embodiment.

Figure 16:
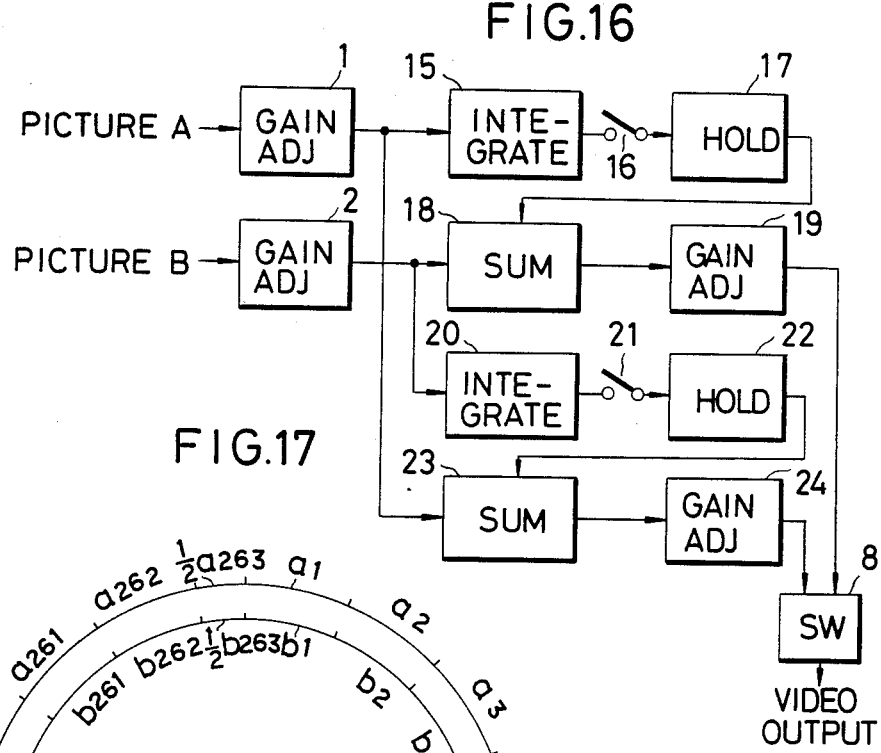
FIG. 16 is a block diagram showing a fourth embodiment of the invention.

FIG. 16 shows still another embodiment of the invention. Whereas in the embodiment described with reference to FIG. 14, the two pictures are not classified as a primary picture and an insertion picture and the pictures are each manually shifted in the level in accordance with the luminance of the other picture, thus allowing the operator to operate continuously to change from a condition where the one picture is practically not displayed to another condition where the other picture is practically not displayed while looking at the screen, the embodiment of FIG. 16 is designed to effect the manual operation automatically In FIG. 16, numerals 1 and 2 designate luminance signal gain adjusting circuits, and 15 and 20 designate integrating circuits. While, in this embodiment, the integrating circuits 15 and 20 compute the average value of the luminance information of pictures A and B, respectively, each of them integrates for one field period when the average value of each field is to be added as in the first embodiment and integrates for one horizontal period when the average value of each horizontal period is to be added as in the second embodiment. Numerals 16, 17 and 21, 22 designate sample and hold circuits so that the result of the integration is held for one field period when the integration takes place for each field period as in the first embodiment. Each of the hold circuits 17 and 22 includes an analog delay line when the integration takes place for each horizontal scanning period.

Circuits 18 and 23 are summing circuits which function in the same manner as in the previously mentioned embodiments. Circuits 19 and 24 are gain adjusting circuits which operate in the same manner as in the previously mentioned embodiments.

The embodiments described so far belong to the previously mentioned field multiplexing method and this method still has some danger of causing the sensation of flicker of the pictures to the eye since every two of the pictures for multiplexing reproduction are reproduced at intervals of at least one field period (1/60 sec).

Figure 17:
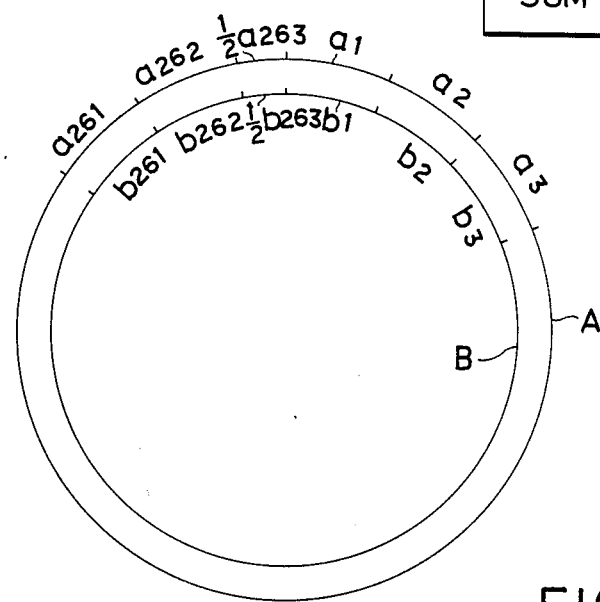
FIG. 17 is a schematic diagram showing in detail the record patterns of two still picture signals on a magnetic sheet.
Figure 18:
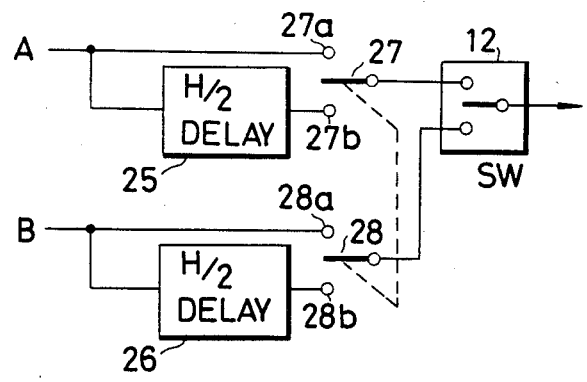
FIG. 18, consisting of A and B, is a block diagram showing the principal part of a fifth embodiment of the invention.
Figure 19:
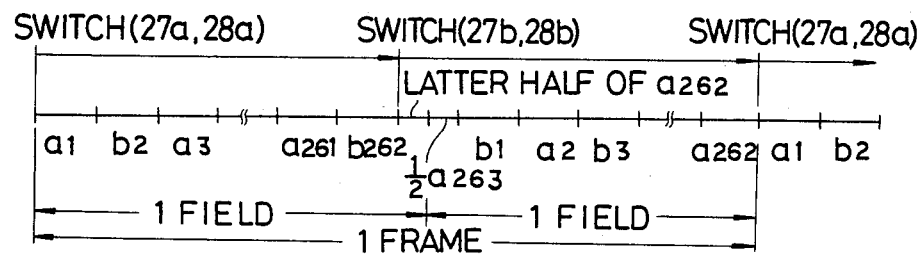
FIG. 19 is a diagram showing the timing of the switching operation effected by the circuit construction of FIG. 18 according to the line mutliplexing method.

On the contrary, in accordance with the previously mentioned line multiplexing method the selection and switching between the two pictures are effected at intervals of one horizontal scanning line and the occurrence of visual flicker can be reduced considerably. The embodiment will now be described with reference to the line multiplexing method. FIG. 17 shows an example of the recording tracks on a magnetic sheet and it is assumed that the still picutre signal (signal A) of the picture A and the still picture signal (signal B) of the picture B have been respectively recorded in the patterns shown on tracks A and B at the rotation rate of 3,600 rpm. In FIG. 17, $a_1$, $a_2$ ... and $b_1$, $b_2$ ... designate the horizontal scan signals for the horizontal periods of the pictures A and B. Referring to FIGS. 18 and 19, a description will now be given of the line multiplexing method in which the two pictures recorded in the described manner are reproduced simultaneously by means of two heads and also the pictures are changed over line by line for multiplexing reproduction. FIG. 18 shows an embodiment of switching means adapted for use with the line multiplexing method and the line multiplexing method is realized by replacing the switching circuit 8 in FIGS. 7, 12, 14 and 16 which show the embodiments of the field multiplexing method. In FIG. 18, numerals 25 and 26 designate H/2 delay lines, 27 and 28 designate switches each adapted to effect switching at intervals of approximately one field, and 12 denotes a switching circuit adapted to effect switching at intervals of 1H. FIG. 19 shows the switching timings of these switches. To reproduce the first field, the switches 27 and 28 are respectively moved to positions 27a and 28a and the switch 12 changes into position at intervals of 1H. As a result, the pictures signals A and B are reproduced in the order of $a_1$, $b_2$, $a_3$ ... as shown in FIG. 19. Upon completion of the reproduction of $b_{262}$, the switchs 27 and 28 are respectively changed to positions 27b and 28b and the reproduction of the latter half of $a_{262}$ and ½ $a_{263}$ is effected during the next 1H period. The reproduction of the next field is initiated starting at the ½ $a_{263}$ so that the reproduction is effected in the order of $b_1$, $a_2$, $b_3$ ... and the reproduction of one frame is completed upon reproduction of $a_{262}$. Thereafter, the switches 27 and 28 are changed to the positions 27a and 28a and the same operation is repeated. By performing the reproduction in this way, it is possible to reduce the flicker to the eye. Further, by using the switching circuit of this embodiment in place of the switching circuit 8 in the first to fourth embodiments, it is possible to set each picture to the best luminance level. In other words, the field average photometric and line multiplexing method, the line average photometric and line multiplexing method, etc., are made possible.

Figure 20:
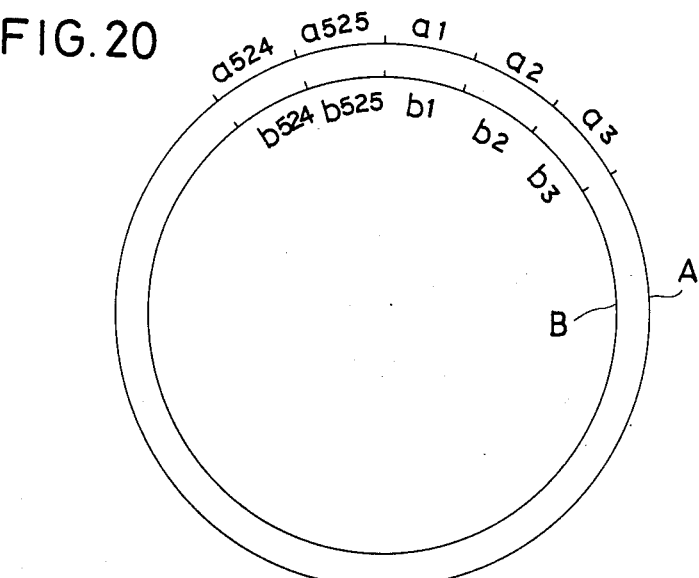
FIG. 20 is a schematic diagram showing another example of the record patterns of two still picture signals on the magnetic sheet.

FIG. 20 shows another example of the recording tracks on the magnetic sheet. The pictures A and B, one frame each, have been recorded on the tracks A and B, respectively. The rotational speed of the magnetic sheet is 1,800 rpm. Designated at $a_1$, $a_2$ ... $a_{525}$ and $b_1$, $b_2$ ... $b_{525}$ are the horizontal scan signals for the horizontal periods of the pictures A and B, respectively. To superpose and reproduce the signals from these tracks A and B, it is only necessary to adjust the timing of the switching operation of the switching circuit 8 in FIG. 7, 12, 14 or 16. For example, the switching circuit 8 is operated at intervals of one field period in the case of the field multiplexing method and at intervals of one horizontal period (1H) in the case of the line multiplexing method.

While two pictures are multiplexed in the embodiments described above, the multiplexing method of the invention is not limited to the reproduction of two pictures and three or more pictures can, of course be multiplexed. In addition, the similar multiplexing effect can be obtained by the recording and reproduction of frame pictures in place of field pictures.

Figure 21:
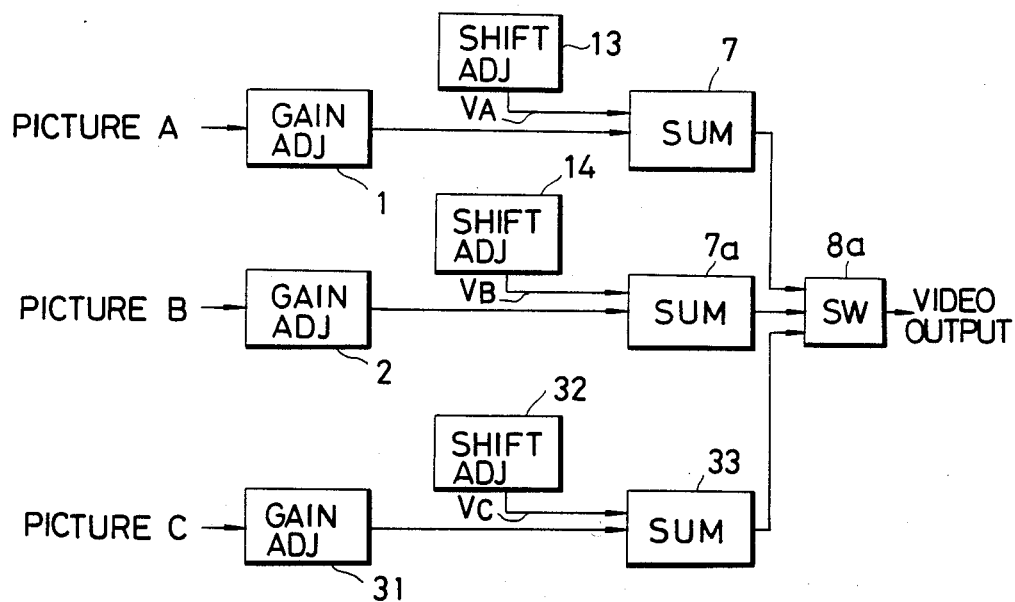
FIG. 21 is a block diagram showing a sixth embodiment of the invention.

FIG. 21 shows the circuit construction of another embodiment of the invention which multiplexes three pictures according to the field multiplexing method.

The basic construction of the embodiment of FIG. 21 is the same as that of the embodiment shown in FIG. 14 and the same reference numerals as used in FIG. 14 designate the equivalent components. The difference resides in that a gain adjusting circuit 31, a shift adjusting circuit 32 and a summing circuit 33 are added for a picture C and that the switching circuit 8a sequentially selects and delivers the outputs from the summing circuits 7, 7a and 33 at intervals of one field.

In accordance with this embodiment, while the pictures A, B and C are sequentially reproduced at intervals of 1/30 second so that the flicker is increased somewhat as compared with the multiplexing of two pictures, this gives rise to no problem from the practical point of view. In accordance with the line multiplexing method, the multiplexing of three pictures can reduce the flicker further. In this case, however, the total number of lines is fixed and therefore it is necessary to suitably thin out the lines of the respective pictures and conform with the fixed total number of lines thereby preventing any partial distortions in the pictures to be superimposed.

Note that while, in the embodiments described so far, the gain adjustment and shift adjustment of the luminance level are performed manually, it is easy to construct an embodiment for performing these operations automatically.

From the foregoing description it will be seen that in accordance with the invention there is provided a reproducing apparatus for electronically recorded still picture signals which is capable of easily ensuring the multiple-shot effect without using any large-capacity memory such as a field memory to frame memory and also is capable of superposing different pictures by setting the same to the best exposure conditions, thus making it possible to enjoy such pictures with the improved visual effect by means of the ordinary television receiver.

What is claimed is:

1. An apparatus for reproducing a plurality of still picture signals, said still picture signals being taken by different shots and recorded on a recording medium, comprising:
    (a) reading means for reading first and second still picture signals from said recording medium;
    (b) averaging means for determining an average luminance value of at least one portion in one field of said first still picture signal read by said reading means and producing an output signal corresponding to said average luminance value;
    (c) summing means for adding said output signal produced by said averaging means to said second still picture signal for one field, and producing the resultant signal; and
    (d) switching means for inputting said resultant signal produced from said summing means and said first still picture signal and alternately outputting said resultant signal and said first still picture signal at intervals of a predetermined duration.

2. An apparatus according to claim 1, wherein said reading means read out said first and second still picture signals at the same time from said recording medium, and wherein said predetermined duration substantially corresponds to the time during which said reading means read out one field of said first and second still picture signals from said recording medium.

3. An apparatus according to claim 1, wherein said reading means reads out said first and second still picture signals at the same time from said recording medium, and wherein said predetermined duration substantially corresponds to the time during which said recording means read out one horizontal scanning line of said first and second picture signals from said recording medium.

4. An apparatus according to claim 3, wherein said switching means includes:
(a) first means for delaying each of said first and second signals inputted into said switching means for a time substantially equal to half of said predetermined duration; and
(b) second means for alternately outputting the first set of said first and second still picture signals and the second set of said first and second still picture signals at intervals of the time in which said reading means read out one field of said first and second still picture signals from said recording medium, said first set of said first and second still picture signals being inputted into said switching means before being delayed by said first means and said second set of said first and second still picture signals being delayed by said first means.

5. An apparatus according to claim 1, wherein said averaging means determine an average luminance value of said first still picture signal for one field.

6. An apparatus for reproducing a plurality of still picture signals, said still picture signals being taken by different shots and recorded on a recording medium, comprising:
(a) reading means for reading first and second still picture signals from said recording medium;
(b) averaging means for determining an average luminance value of at least one portion of each horizontal scanning line of said first still picture signal read by said reading means, and producing an output signal substantially corresponding to said average luminance value;
(c) delay means for delaying said output signal produced by said averaging means for the time during which said first and second still picture signals are read by said reading means for one field;
(d) summing means for adding said delayed output signal produced from said averaging means to said second still picture signal in each horizontal scanning line and producing a resultant signal; and
(e) switching means for inputting said resultant signal produced by said summing means and said first still picture signal and alternately outputting said resultant signal and said first still picture signal at intervals of a predetermined duration.

7. An apparatus according to claim 6, wherein said reading means read out said first and second still picture signals at the same time from said recording medium, and wherein said predetermined duration substantially corresponds to the time during which said reading means read out one field of said first and second still picture signals from said recording medium.

8. An apparatus according to claim 6, wherein said reading means read out said first and second still picture signals at the same time from said recording medium, and wherein said predetermined duration substantially corresponds to the time during which said recording means read out one horizontal scanning line of said first and second still picture signals from said recording medium.

9. An apparatus according to claim 6, wherein said switching means includes:
(a) first means for delaying each of said first and second signals inputted into said switching means for a time substantially equal to half to said predetermined duration; and
(b) second means for alternately outputting the first set of said first and second still picture signals and the second set of said first and second still picture signals at intervals of the time in which said reading means read out one field of said first and second still picture signals from said recording medium, said first set of said first and second still picture signals being inputted into said switching means before being delayed by said first means and said second set of said first and second still picture signals being delayed by said first means.

10. An apparatus according to claim 6, wherein said averaging means determine an average luminance value of said first still picture signal for each horizontal scanning line.

11. An apparatus for reproducing a plurality of still picture signals, said still picture signals being taken by different shots and recorded on a recording medium, comprising:
(a) reading means for reading first and second still picture signals from said recording medium;
(b) means for producing a luminance signal the level of which is manually adjusted externally of said apparatus;
(c) summing means for adding said luminance signal to said first still picture signal and producing a resultant signal; and
(d) switching means for inputting said resultant signal produced by said summing means and said second still picture signal, and alternately outputting said resultant signal and said second still picture signal.

12. An apparatus according to claim 11, wherein said reading means read out said first and second still picture signals at the same time from said recording means, and wherein said predetermined duration substantially corresponds to the time required for said reading means to read one field of said first and second still picture signals from said recording medium.

13. An apparatus according to claim 11, wherein said reading means read said first and second still picture signals at the same time from said recording medium, and wherein said predetermined duration substantially corresponds to the time required for said reading means to read one horizontal scanning line of said first and second still picture signals from said recording medium.

14. An apparatus according to claim 11, wherein said apparatus further comprises means for adding said adjustable luminance signal to said second still picture signal before said luminance signal and said second still picture signal are inputted to said swtiching means.

* * * * *